United States Patent
Maris

(10) Patent No.: US 9,527,978 B2
(45) Date of Patent: Dec. 27, 2016

(54) PROCESS FOR RECYCLING AND DE-VULCANIZING RUBBER

(75) Inventor: Gianfranco Maris, Rivoli (IT)

(73) Assignee: F.LLI MARIS S.p.A., Rosta (Turin) (IT)

( * ) Notice: Subject to any disclaimer, the term of this patent is extended or adjusted under 35 U.S.C. 154(b) by 0 days.

(21) Appl. No.: 13/814,066

(22) PCT Filed: Aug. 5, 2011

(86) PCT No.: PCT/IB2011/053503
§ 371 (c)(1),
(2), (4) Date: Feb. 4, 2013

(87) PCT Pub. No.: WO2012/017414
PCT Pub. Date: Feb. 9, 2012

(65) Prior Publication Data
US 2013/0137786 A1  May 30, 2013

(30) Foreign Application Priority Data
Aug. 5, 2010  (IT) .............................. TO2010A0681

(51) Int. Cl.
*C08J 11/06*  (2006.01)
*C08J 11/10*  (2006.01)
*C08L 19/00*  (2006.01)

(52) U.S. Cl.
CPC ................ *C08J 11/06* (2013.01); *C08J 11/10* (2013.01); *C08L 19/003* (2013.01); *C08J 2319/00* (2013.01); *Y02W 30/702* (2015.05)

(58) Field of Classification Search
CPC ......... C08J 11/06; C08J 11/10; C08J 2319/00; C08L 19/003; C08L 17/00; Y02W 30/702
USPC ................... 521/40, 40.5, 41, 45.5
See application file for complete search history.

(56) References Cited

U.S. PATENT DOCUMENTS

| 5,225,497 A | * | 7/1993 | Ishii et al. ..................... 525/437 |
| 2002/0145227 A1 | * | 10/2002 | Boudreau et al. ....... 264/211.23 |
| 2003/0160359 A1 | * | 8/2003 | Ito .................. 264/211 |
| 2005/0066646 A1 | * | 3/2005 | Kwon et al. .................... 57/258 |
| 2008/0113146 A1 | * | 5/2008 | Wright et al. .................. 428/95 |
| 2009/0082475 A1 | | 3/2009 | Zhang et al. |

FOREIGN PATENT DOCUMENTS

| JP | 54-22480 | * | 2/1979 |
| JP | 06-210633 A | | 8/1994 |
| JP | 2002-337213 A | | 11/2002 |

OTHER PUBLICATIONS

Derwent abstract of JP54-22480.*
Ahmad Reza Jalilvand, et al., "A Study of EPDM Devulcanization in a Co-rotating Twin-screw Extruder", Iranian Polymer Journal, 2007, pp. 1-9, vol. 16, No. 5.
Jalilvand, A. R. et al., "A Study of EPDM Devulcanization in a Co-rotating Twin-screw Extruder", Iranian Polymer Journal, Jun. 27, 2007, pp. 327-335, 16 (5).
English translation of communication dated Jun. 10, 2014, issued by the State Intellectual Property Office of P.R. China in counterpart Chinese application No. 201180038390.6.

* cited by examiner

*Primary Examiner* — Frances Tischler
(74) *Attorney, Agent, or Firm* — Sughrue Mion, PLLC

(57) ABSTRACT

The process for recycling and de-vulcanizing vulcanized rubber comprises the steps of: grinding said rubber in a mill in order to shred it into particles having a size substantially comprised between 5 and 15 mm; introducing the particles in an initial section of a two-screw co-rotating extruder having a length 64 times or more the external diameter of the screws, mixing the particles within the extruder, which is kept at a temperature comprised between 35 and 350° C., due to the screw rotation at a speed comprised between 15 and 300 rpm; and obtaining an extruded product formed by de-vulcanized rubber.

7 Claims, No Drawings

PROCESS FOR RECYCLING AND DE-VULCANIZING RUBBER

CROSS REFERENCE TO RELATED APPLICATIONS

This application is a National Stage of International Application No. PCT/IB2011/053503 filed Aug. 5, 2011, claiming priority based on Italian Patent Application No. TO 2010A000681 filed Aug. 5, 2010, the contents of all of which are incorporated herein by reference in their entirety.

The present invention relates to a process for recycling and de-vulcanizing rubber, constituted in particular by industrial manufacturing rejects and/or by articles which have reached the end of their useful life cycle and originate from specialist collection centres and/or landfill sites.

The molecular chains of vulcanized rubber are typically linked by means of chemical bonds which evolve across bridges of sulphur atoms, which link them transversely. The vulcanized rubber therefore has a structure which is analogous to that of a thermosetting polymer, and thereby cannot be reused as such in the productive cycle.

Therefore, a recycling process has to make it possible to break the chemical bonds created by the sulphur, in such a manner that the elastomeric material returns to the original physical/chemical state prior to the vulcanization treatment and is ready to be reused in the productive cycle.

Many de-vulcanization processes, both continuous and batchwise, have already been proposed, in which the energy required to break the bonds created by the sulphur is supplied in thermal, mechanical, acoustic (ultrasound) and/or electromagnetic (microwave) form, sometimes also making use of chemical additives.

Mohammad Karrabi et al., "A Study of EPDM Devulcanization in a Co-rotating Twin-screw Extruder", Iranian Polymer Journal 16(5), 2007, 327-335 describes a process for de-vulcanizing a specific rubber—that is EPDM—in a two-screw co-rotating extruder having an L/D ratio of 40. This study links the effectiveness of the results, relating solely to the de-vulcanization of a specific rubber, EPDM, merely to the content of de-vulcanization agent, to the speed of rotation of the screws and to the process temperature, without even mentioning the possibility of treating rubbers of differing nature.

US-2009/0082475 describes a process for de-vulcanizing rubber in a two-screw co-rotating extruder, in which a thermoplastic polymer has to be added to particles of rubber having a size comprised between 150 microns and 5 mm and said particles have to be treated in an extruder having an L/D ratio of 24-60, preferably 32-48, with the screws which rotate at a speed comprised between 300 and 1600 rpm, preferably between 800 and 1000 rpm. The extruded de-vulcanized product is then cooled with water.

JP-2002 337 213 describes a process for de-vulcanizing rubber in a two-screw extruder having an L/D ratio of 52.5.

JP-6 210 633 describes a process for de-vulcanizing rubber in a one-screw extruder.

The known processes have a number of disadvantages owing to their specificity, which allows only certain types of vulcanized elastomeric material to be treated, to the high consumption of energy per unit of de-vulcanized material produced and to the associated high degree of wear to the machinery used, as well as to the fact that they produce a de-vulcanized rubber with a very strong and acrid smell, which has a strong influence on the possibilities for reuse.

It is therefore an object of the present invention to provide a process which is free of the disadvantages mentioned above.

According to the invention, this object is achieved by a process for recycling and de-vulcanizing vulcanized rubber, comprising the steps of:

grinding said rubber in a mill in order to shred it into particles having a size substantially comprised between 5 and 15 mm (the extreme values of the range possibly being excluded), introducing said particles in an initial section of a two-screw co-rotating extruder having a length 64 times or more the external diameter of the screws, mixing said particles within the extruder, which is kept at a temperature comprised between 35 and 350° C., due to the screw rotation at a speed comprised between 15 and 300 rpm (the extreme values of the range possibly being excluded), and obtaining an extruded product formed by de-vulcanized rubber.

The process of the invention is very flexible in terms of the starting materials to be treated and, in principle, makes it possible to de-vulcanize all types of vulcanized rubber or mixtures thereof, such as for example natural rubber (NR), butadiene rubber (BR), ethylene propylene rubber (EPR), styrene butadiene rubber (SBR), nitrile rubber (NBR), ethylene propylene diene monomer rubber (EPDM), isoprene rubber (IR) and chloroprene rubber (CR).

In addition, other substances, such as thermoplastic materials or process additives, do not have to be added to said rubbers, and this results in a reduction in the process costs as well as in the environmental impact connected to the use thereof.

The extruder which can be used in the process of the invention is of conventional type and is provided, for example, with screws equipped with mixing elements, which have a reduced external profile, as described in EP-1 136 228 B1, and which make it possible to control the shearing stresses imparted on the material being manufactured and thus the specific energy absorbed by the latter.

On the whole, the process of the invention makes it possible to break the sulphur bridges present between the chains of the rubber without degrading the latter, owing to the gradual administration of both thermal energy—on account of the heating of the extruder cylinder—and mechanical energy—on account of the shearing stress exerted by the rotating screws—to the particulate material having the granulometry mentioned above.

It should be noted that the particles of vulcanized rubber can be both regular and irregular, as long as the maximum size thereof, in particular the diameter if spherical particles are involved, is comprised between 5 and 15 mm, and preferably between 10 and 15 mm (the extreme values of these ranges possibly being excluded). The possibility to use particles of this size bestows an important technological advantage on the process of the invention, because the reduction in the size thereof conventionally carried out by grinding in mills or similar known apparatuses requires a significant expenditure of energy. By way of example, the reduction of a particle size from 15 to 5 mm requires a specific power of about 0.045 kW/kg and the subsequent reduction from 5 mm into powder—which is usually carried out in a second pass—requires a specific power of about 0.16 kW/kg.

The process of the invention is particularly advantageous in terms of the energy balance, since the mechanical power supplied by the main motor of the extruder to the vulcanized rubber treated therein is comprised between 0.1 and 0.4 kW/kg of de-vulcanized rubber produced. By comparison, the corresponding values for conventional processes carried out in two-screw extruders are of the order of 0.6-0.8 kW/kg.

In preferred embodiments of the invention, water is introduced into at least one section of the extruder located at a distance of at least 48 times the external diameter of the screws downstream of the initial section, and in addition the gases formed inside the extruder are sucked out by degassing means, in particular extraction openings provided, for example, with mechanical valves. The latter maintain a constant overpressure inside the extruder and make it possible to expel gases and/or vapours formed during the de-vulcanization process to the outside. The use of the latter devices makes it possible to lessen the smell of the extruded final product, the quality of which is thereby further increased and provides a substantially unlimited range of possibilities for reuse.

Again preferably, the extruder can have a length comprised between 64 and 80 times the external diameter of the screws, which are made to rotate at a speed comprised between 15 and 150 rpm.

Further advantages and features of the present invention will become evident from the following, non-limiting exemplary embodiment.

Scraps of vulcanized rubber of the EPDM type, obtained from articles which are rejected and/or have reached the end of their useful life, are shredded in a mill until particles having a size comprised between 5 and 15 mm are obtained. These particles are loaded into a two-screw extruder of the co-rotating and inter-penetrating type, having a length 64 times the diameter of the screws. The extruder is kept at a temperature of about 270° C., and the screws are made to rotate in the same direction at a speed of about 150 rpm. A product formed by de-vulcanized rubber, which was supplied with a specific mechanical power of the order of 0.25 kW/kg by the main motor of the extruder during the treatment, is extruded from the extruder. The features of the extruded product are substantially similar to those of the virgin rubber before it was vulcanized; in particular, the Mooney viscosity thereof differs at most by ±5% with respect to that of the virgin starting rubber. The extruded product can be mixed with virgin rubber and subjected to a new vulcanization cycle, advantageously in a quantity comprised between 30 and 50 parts per 100 parts in weight of the mixture.

Clearly, without departing from the principle of the invention, the details of construction and the embodiments may differ considerably from those described purely by way of example, without thereby departing from the scope of the invention.

The invention claimed is:

1. Process for recycling and de-vulcanizing vulcanized rubber, comprising:
   grinding said rubber in a mill to shred it into particles having a size substantially comprised between 5 and 15 mm;
   introducing said particles in an initial section of a two-screw co-rotating extruder having a length more than 64 times the external diameter of the screws without adding to the particles of vulcanised rubber either thermoplastic materials or process additives;
   mixing said particles within the extruder, which is kept at a temperature comprised between 35 and 350° C. due to the screw rotation at a speed comprised between 15 and 300 rpm, and at a constant overpressure higher than a pressure outside the extruder;
   introducing water into said extruder in at least one section located at a distance of at least 48 times the external diameter of the screws downstream of said initial section, and
   wherein no water is added into said extruder in any section located at a distance lower than 48 times the external diameter of the screws from the initial section of the extruder;
   obtaining an extruded product formed by de-vulcanized rubber having a Mooney viscosity differing at most +/−5% with respect to that of virgin rubber prior to the vulcanization;
   mixing said extruded product formed by de-vulcanized rubber with virgin rubber; and
   vulcanizing the mixture of extruded product and virgin rubber.

2. Process according to claim 1, wherein said extruder is provided with means for expelling gases and/or vapours formed inside.

3. Process according to claim 1, wherein said screws rotate at a speed comprised between 15 and 150 rpm.

4. Process according to claim 1, wherein said extruder has a length no more than 80 times the external diameter of the screws.

5. Process according to claim 1, wherein the mechanical power supplied by a main motor of the extruder to the vulcanized rubber treated therein is comprised between 0.1 and 0.4 kW/kg of de-vulcanized rubber produced.

6. Process according to claim 1, wherein said vulcanized rubber is shred into particles having a size greater than 10 mm and less than 15 mm.

7. Process according to claim 1, wherein said screws rotate at a speed comprised between 150 and 300 rpm.

* * * * *